(12) United States Patent
Tanimura et al.

(10) Patent No.: US 6,470,011 B1
(45) Date of Patent: Oct. 22, 2002

(54) TIME DIVISION MULTIPLEX HIGHWAY SWITCH CONTROL SYSTEM AND CONTROL METHOD OF T-S-T THREE-STAGE SWITCHES IN ELECTRONIC SWITCHING SYSTEM

(75) Inventors: Takuji Tanimura; Hiroyuki Moride, both of Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/112,716

(22) Filed: Jul. 8, 1998

(30) Foreign Application Priority Data

Jul. 8, 1997 (JP) .............................................. 9-182204

(51) Int. Cl.[7] .......................... H04L 12/50; H04Q 11/00
(52) U.S. Cl. ........................ 370/369; 370/370; 370/372; 370/375; 370/380
(58) Field of Search ................................ 370/369, 360, 370/370, 372, 375, 380, 352, 353, 354, 356, 359, 361, 362, 367, 376, 386, 387, 388, 355

(56) References Cited

U.S. PATENT DOCUMENTS 5,513,177 A * 4/1996 Sakurai et al. .............. 370/335
5,654,967 A * 8/1997 Okuyama et al. ........... 370/375
5,914,952 A * 6/1999 Eom et al. .................. 370/369

FOREIGN PATENT DOCUMENTS

JP          61-58397          3/1986

* cited by examiner

Primary Examiner—Dang Ton
Assistant Examiner—Phirin Sam
(74) Attorney, Agent, or Firm—Foley & Lardner (57) ABSTRACT

A highway switch control system for controlling a time division multiplex highway switch of T-S-T three-stage switches in a multiprocessor typed electronic switching system, comprises a plurality of sets of first switches of time sharing switching method, second switches of highway switching method, third switches of time sharing switching method, and processors for controlling each switch, the two processors to be connected together getting information on spare time slots of the mutual switches and deciding time slots for use in the connection, thereby controlling a connection between required switches.

11 Claims, 8 Drawing Sheets

| | | | | | | | | |
|---|---|---|---|---|---|---|---|---|
| 0 | 1 | 1 | 1 | 1 | 1 | 0 | 0 | 1 |
| 1 | 1 | 0 | 1 | 1 | 1 | 0 | 0 | 1 |
| 2 | 0 | 0 | 1 | 0 | 0 | 1 | 0 | 1 |
| 3 | 1 | 0 | 0 | 0 | 0 | 0 | 1 | 0 |
| 4 | 1 | 0 | 0 | 0 | 0 | 1 | 1 | 1 |
| 255 | 0 | 0 | 0 | 0 | 0 | 0 | 0 | 0 |

FIG. 9

| | | | | | | | | |
|---|---|---|---|---|---|---|---|---|
| 0 | 1 | 1 | 1 | 1 | 1 | 1 | 1 | 1 |
| 1 | 1 | 1 | 1 | 1 | 1 | 1 | 1 | 1 |
| 2 | 1 | 0 | 1 | 1 | 1 | 1 | 1 | 1 |
| 3 | 1 | 0 | 0 | 1 | 0 | 0 | 1 | 0 |
| 4 | 1 | 1 | 0 | 0 | 1 | 1 | 1 | 1 |
| 255 | 0 | 0 | 0 | 0 | 0 | 0 | 0 | 0 |

FIG. 10 (PRIOR ART)

TIME DIVISION MULTIPLEX HIGHWAY SWITCH CONTROL SYSTEM AND CONTROL METHOD OF T-S-T THREE-STAGE SWITCHES IN ELECTRONIC SWITCHING SYSTEM

BACKGROUNDS OF THE INVENTION

1. Field of the Invention

The present invention relates to a control system and a control method of a time sharing switch in an electronic switching system, and more particularly, to a time division multiplex highway switch control system and control method of T-S-T three-stage switches in a multiprocessor typed electronic switching system.

2. Description of the Related Art

Generally, there has been used a conventional method of providing a multiprocessor typed electronic switching system with each processor for every predetermined number of accommodating terminals, for the purpose of dispersing the load. When forming a switch of a large volume by use of such a multiprocessor typed electronic switching system, there has been adopted a method of forming a general time sharing switch having a T-S-T three-stage structure, with a plurality of dispersedly provided first T-stages and third T-stages respectively controlled by a plurality of corresponding processors dispersedly provided and with second S-stages centrally controlled by a single processor.

This kind of electronic switching system is disclosed in, for example, Japanese Patent Publication Laid-Open (Kokai) No. Showa 61-58397, "Time Sharing Communication Channel Control Device". The structure of the conventional general time sharing switch disclosed in the same publication is shown in FIG. 10.

Figure 10:
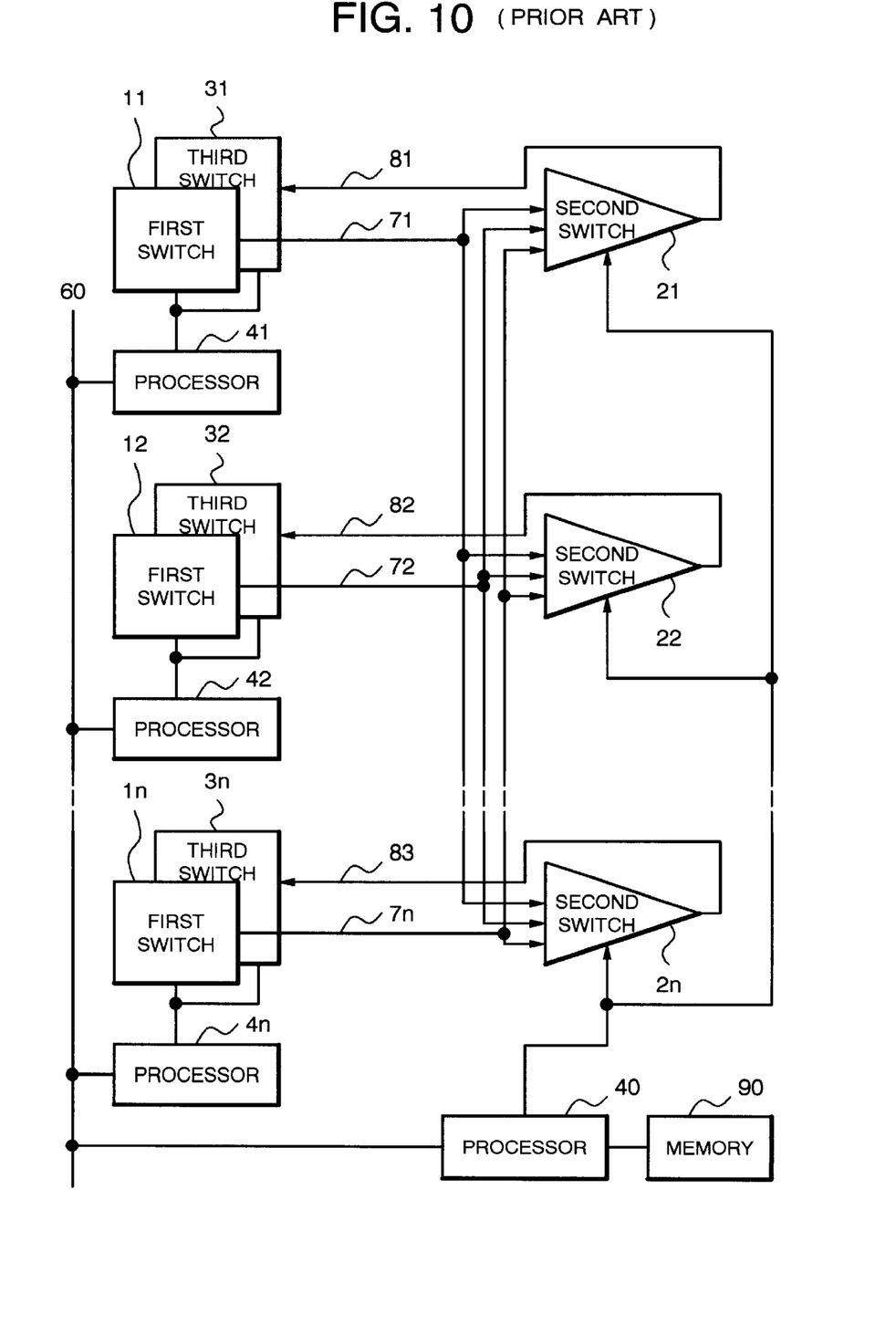
FIG. 10 is a block diagram showing the structure of a conventional highway switch control system.

With reference to FIG. 10, the conventional T-S-T three-stage time sharing switch system comprises first switches 11, 12 to 1n, second switches 21, 22 to 2n, third switches 31, 32 to 3n, processors 41, 42 to 4n for controlling the first switches and the third switches, a processor 40 for controlling the second switches 21, 22 to 2n, an interposing bus 60 between processors for connecting the processors 40, 41, 42 to 4n with each other, output highways 71, 72 to 7n for connecting the respective first switches 11, 12 to 1n with all the second switches 21, 22 to 2n, output highways 81, 82 to 8n for connecting the respective second switches 21, 22 to 2n with the corresponding third switches 31, 32 to 3n and a memory 90 storing the spare time slot information of the respective second switches 21, 22 to 2n which are referred to by the processor 40 in order to control the second switches 21, 22 to 2n.

Considering the case of achieving a switching connection from a terminal 102 under the control of the processor 42 to a terminal 101 under the control of the processor 41, it is necessary to connect a path passing from the terminal 102 to the terminal 101 via the first switch 12, the second switch 21, and the third switch 31, in this connection. In order to enable the second switch to exchange output highways, it is necessary to coincide the time slots on the output side of the first switch and the time slots on the input side of the third switch.

Therefore, the processor 42 on the input side of this connection asks the processor 40 about the spare time slots available for the connection to the third switch 31 accommodating the terminal 101 of the connection party, through the interposing bus 60 between processors. The processor 40 makes a comparison between the spare time slots of the output highway 72 of the first switch 12 used for the connection and the spare time slots of the output highway 81 of the second switch 12, and selects each time slot of being both empty, thereby performing the connection of the corresponding highway. The processor 40 notifies the processor 42 of the selected time slot number "m". The processor 42 interconnects the time slots for accommodating the terminal 101 and the time slots "m" in the first switch 12. The processor 42 asks the processor 41 to connect to terminal 101 by use of the time slots "m" through the interposing bus 60 between processors. The processor 41 interconnects the time slots for accommodating the terminal 102 and the time slots "m", in the third switch 31. As a result, the connection from the terminal 101 to the terminal 102 is completed.

However, in the above-mentioned conventional highway switch control method, a single processor controls highways. Therefore, when a fault occurs in this processor, the whole system fails to do switching, even if there is no fault in a processor controlling T-stage.

In the above publication, disclosed is an electronic switching system of a redundant structure including a plurality of dispersedly provided time sharing switches and thereby capable of eliminating the fault affecting the whole electronic switching system even if a fault occurs in a common control portion. However, since the ratio of the redundant structure portion in the electronic switching system is increased, this invention is not suitable for a large scaled switching system such as the T-S-T structure.

SUMMARY OF THE INVENTION

An object of the present invention is, in order to solve the above problems, to provide an extremely reliable highway switch control system and control method suitable for decentralized control, with commonly controlled portion eliminated from the T-S-T three-stage time sharing switch system.

Another object of the present invention is, in addition to the above object, to provide a highway switch control system and control method suitable for a large-scaled switching structure like a T-S-T structure without redundant circuitry.

According to the first aspect of the invention, a highway switch control system for controlling a time division multiplex highway switch of T-S-T three-stage switches in a multiprocessor typed electronic switching system, comprises a plurality of sets of first switches of time sharing switching method, second switches of highway switching method, third switches of time sharing switching method, and control means for controlling each switch, interconnecting means for interconnecting the control means each other in each set, first output highways for connecting each of the first switches in every set to all the second switches of all sets, and second output highways for respectively connecting the second switches to the third switches in every set, two of the control means to be connected together getting information on spare time slots of the mutual switches through the interconnecting means and deciding time slots for use in the connection, thereby controlling a connection between required switches.

In the preferred construction, the highway control system further comprises connection means for exclusive use in connecting the control means to the second switches in each set.

In the preferred construction, the respective sets further comprise storing means for storing information on spare time slots in the respective switches, and the control means decide time slots for use in a connection with reference to the information stored in the storing means.

In another preferred construction, the respective sets further comprise storing means for storing information on spare time slots in the respective switches, and the control means makes a comparison between the information stored in the storing means of one's own and the information stored in the storing means of the connected party, so to detect the coincident spare time slots, which are defined as the time slots for use in the connection.

According to the second aspect of the invention, a highway switch control method for controlling a time division multiplex highway switch by control means provided correspondingly to first switches of time sharing switching method, second switches of highway switching method, and third switches of time sharing switching method forming T-S-T three-stage switches, in a multiprocessor types electronic switching system, the method comprising the steps of a step of deciding time slots for use in this connection by examining spare time slots of the first switch and the third switch, when connection the first switch to the third switch, and a step of connecting an output highway between the first switch and the second switch corresponding to the third switch and an output highway between the second switch and the corresponding third switch, at a timing of the decided time slots for use in the connection.

In the preferred construction, the time slot deciding step further includes a step of delivering an information on the spare time slots of the first switch to the control means controlling the third switch, a step of, upon receipt of the information on the spare time slots of the first switch, deciding the coincident spare time slots as the time slots for use in the connection by making a comparison between the received information and the information on the spare time slots of the third switch, and a step of notifying the control means controlling the first switch of the decided time slots for use in the connection.

According to another aspect of the invention, a computer readable memory storing a computer program for controlling a time division multiplex highway switch by activating control means provided correspondingly to first switches of time sharing switching method, second switches of highway switching method, and third switches of time sharing switching method forming T-S-T three-stage switches, in a multiprocessor typed electronic switching system, the computer program comprising a step of deciding time slots for use in this connection by examining spare time slots of the first switch and the third switch, when connection the first switch to the third switch, and a step of connecting an output highway between the first switch and the second switch corresponding to the third switch and an output highway between the second switch and the corresponding third switch, at a timing of the decided time slots for use in the connection.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
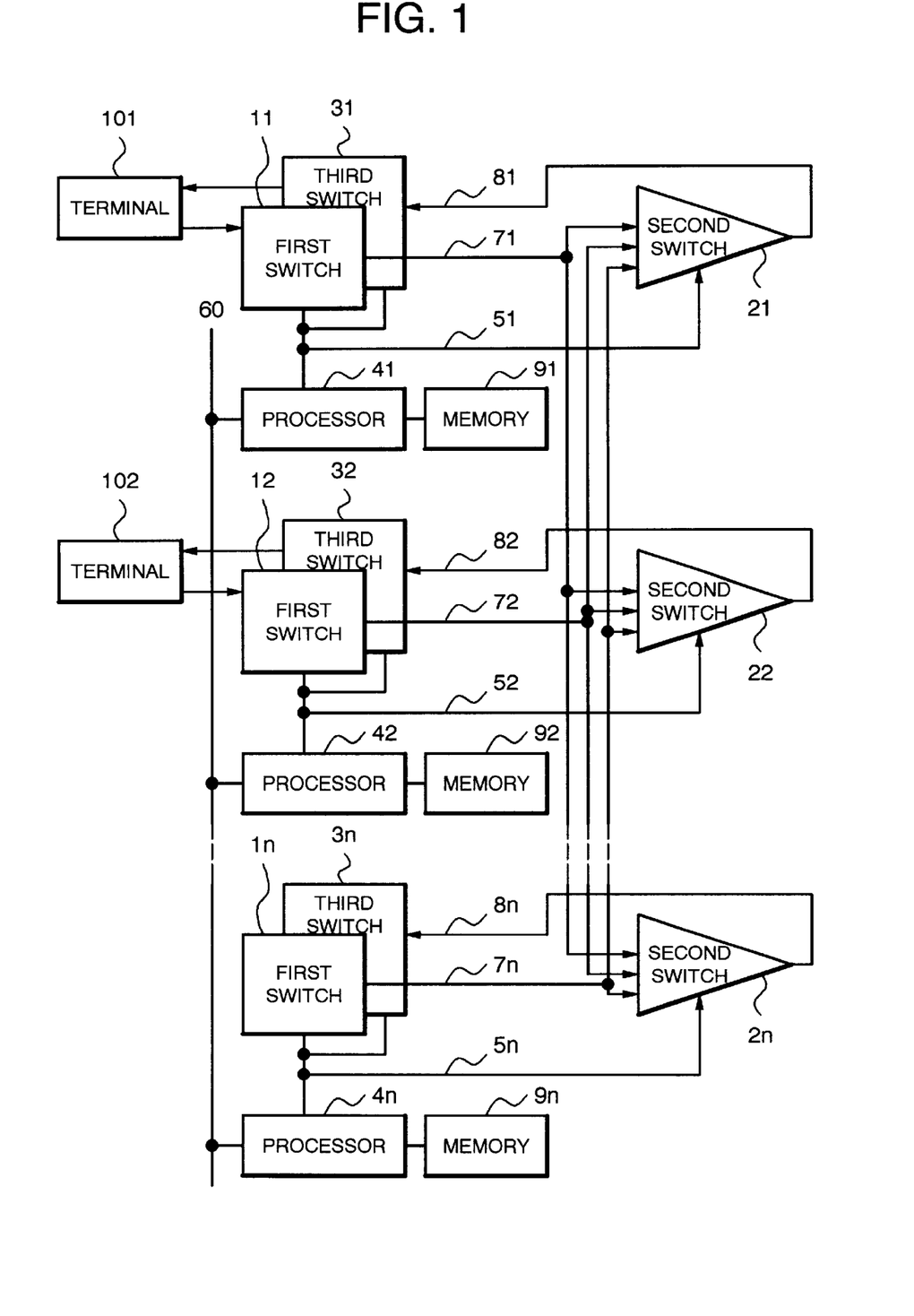
FIG. 1 is a block diagram showing the structure of a highway switch control system according to an embodiment of the present invention.

FIG. 1 is a block diagram showing the structure of a highway switch control system according to an embodiment of the present invention. With reference to FIG. 1, a T-S-T three-stage time sharing switch system according to the embodiment comprises first switches 11, 12 to 1$n$, second switches 21, 22 to 2$n$, third switches 31, 32 to 3$n$, processors 41, 42 to 4$n$ provided correspondingly to the respective switches for controlling the respective switches, an interposing bus 60 between processors for connecting the processors 41, 42 to 4$n$ with each other, output highways 72, 72 to 7$n$ for connecting the respective first switches 11, 12 to 1$n$ with all the second switches 21, 22 to 2$n$, output highways 81, 82 to 8$n$ for connecting the respective second switches 21, 22 to 2$n$ with the corresponding third switches 31, 32 to 3$n$, and memories 91, 92 to 9$n$ which are referred to by the processors 41, 42 to 4$n$ in order to control the switches. FIG. 1 shows only the characteristic components of the embodiment, while the description of the other general components is omitted there.

In the embodiment, the respective processors 41, 42 to 4$n$ are connected to the corresponding second switches 21, 22 to 2$n$ via I/O buses 51, 52 to 5$n$. The memories 91, 92 to 9$n$ store each spare time slot information of each switch pair of the first switches 11, 12 to 1$n$ and the corresponding third switches 31, 32 to 3$n$. Of the processors 41, 42 to 4$n$, two processors concerned with the switch connection (for example, the processors 41 and 42) decides time slots to be used in the connection by comparison between the spare time slot information stored in the corresponding memories 91 and 92, and performs a connection control on one of the second switches to be used in this connection. In FIG. 1, though the memories 91, 92 to 9n and the processors 41, 42 to 4n are described independently, the processors 41, 42 to 4n may contain each memory as the internal memory.

Each processor 41, 42 to 4n is controlled by a computer program, so to perform the above connection control or an operation control. The computer program is provided, stored in a general storing medium such as a magnetic disk, an optical disk, a semiconductor memory, or the like, and it is loaded into, for example, the memories 91, 92 to 9n, or the other storage not illustrated, so to control each processor 41, 42 to 4n.

The first switches 11, 12 to 1n and the third switches 31, 32 to 3n are time sharing switches. The structure and operation thereof will be described, by way of example, in the case where the first switches 11, 12 to 1n and the third switches 31, 32 to 3n are time sharing switches of 2048 multiplex channels.

Figure 2:
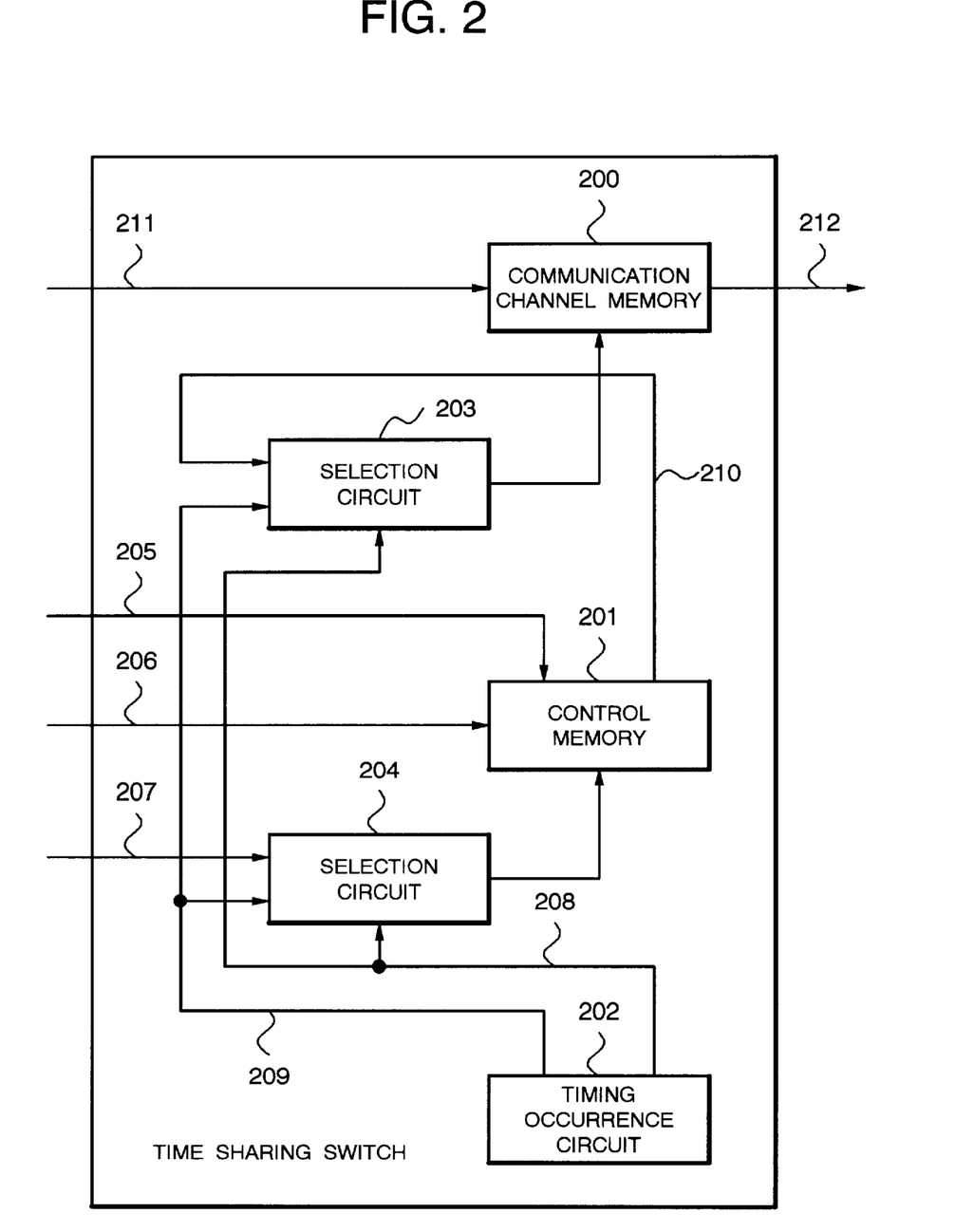
FIG. 2 is a block diagram showing the structure of a time sharing switch.

FIG. 2 is a block diagram showing the structure of the time sharing switch for use in the first switches 11, 12 to 1n and the third switches 31, 32 to 3n. The time sharing switch shown in FIG. 2 comprises a communication channel memory 200, a control memory 201, a timing occurrence circuit 202, and selection circuits 203 and 204.

The communication channel memory 200 is a memory in which PCM signals for performing time sharing switching are temporarily stored, and input data 211 and output data 212 are time shared and multiplexed signals. When the time sharing switch is used as the first switch, the input data 211 is received from a terminal as the time division multiplex input, while the output data 212 is supplied to the output highway connected with the second switch. When the time sharing switch is used as the third switch, the input data 211 is received from the output highway of the second switch, while the output data 212 is supplied to a terminal as the time division multiplex output. The address input of the communication channel memory 200 is connected to the selection circuit 203.

The selection circuit 203 switches the time slot number information 209 supplied from the timing occurrence circuit 202 and the output data 210 of the control memory 201 according to a switching signal 208 supplied from the timing occurrence circuit 202, so to supply either to the address input of the communication channel memory 200.

The control memory 201 receives the inside time slot number information 205 supplied from a processor controlling the time sharing switch. The address input of the control memory 201 is connected to the selection circuit 204.

The selection circuit 204 switches the outside time slot number information 207 supplied from a processor controlling the time sharing switch and the time slot number information 209 supplied from the timing occurrence circuit 202 according to a switching signal 208 supplied from the timing occurrence circuit 202, so to supply either to the address input of the control memory 201.

The timing occurrence circuit 202 is a kind of counter, repeating the generation of the time slot number information 209 incrementing sequentially from "0" to "2047".

Figure 3:
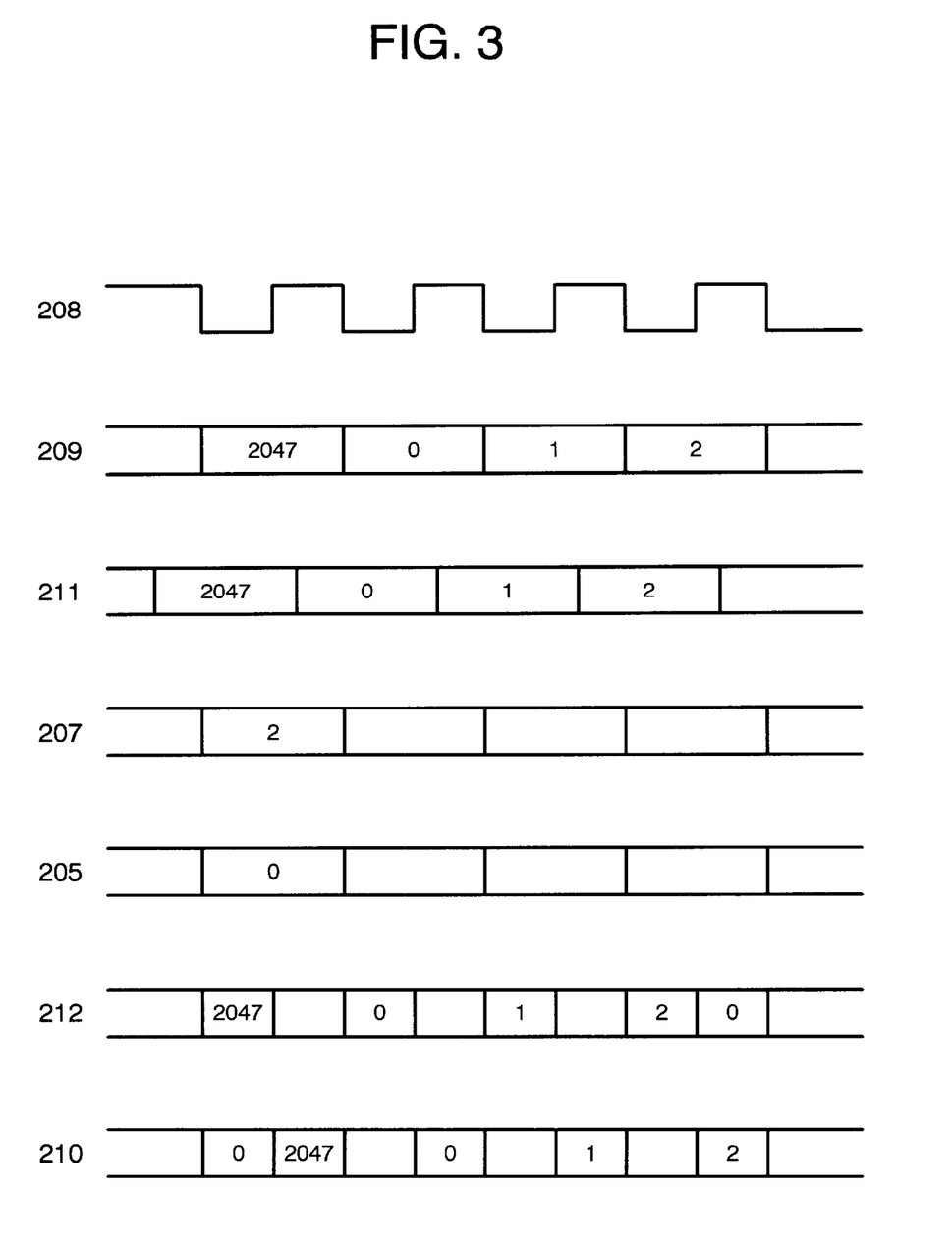
FIG. 3 is a timing chart showing the operation of the time sharing switch.

With reference to the timing chart of FIG. 3, the operation of the time sharing switch will be described this time. The switching signal 208 is a signal varying between "0" and "1" in a half cycle of the output period of one value of the time slot number information 209. At the timing "0" in the switching signal 208, the selection circuit 203 supplies the time slot number information 209 to the communication channel memory 200 as the address signal thereof, and the selection circuit 204 supplies the outside time slot number information 207 to the control memory 201 as the address signal thereof.

A PCM signal corresponding to each time slot indicated in the time slot number information 209 is attached to the input data 211 of the communication channel memory 200, and the PCM signal is sequentially written in the address corresponding to the time slot number of the communication channel memory 200.

While, the processor controlling the time sharing switch sets the inside time slot number information 205 and the outside time slot number information 207 concerned with the connection, and writes the same into the control memory 201 by a writing signal 206. As a result, the inside time slot number is written into the control memory 201 on the address corresponding to the outside time slot number.

At the timing "1" in the switching signal 208, the selection circuit 203 supplies the output of the control memory 201 to the communication channel memory 200 as the address signal thereof, and the selection circuit 204 supplies the time slot number information 209 to the control memory 201 as the address signal thereof. As a result, the inside time slot number information stored in the control memory 201 on the corresponding address is read out therefrom, supplied to the communication channel memory 200 as the address signal thereof, and finally the PCM data of the inside time slots is read out at the timing of the outside time slots.

The above operation is the time sharing switching operation. Although the above description has been made by use of an example of a time sharing switch of 2048 multiplex channels, it is needless to say that a time sharing switch should perform the same operation even if in the other multiplicity.

The second switches 21, 22 to 2n are space sharing switches of time division multiplex type. The structure and the operation of the space sharing switch will be described.

Figure 4:
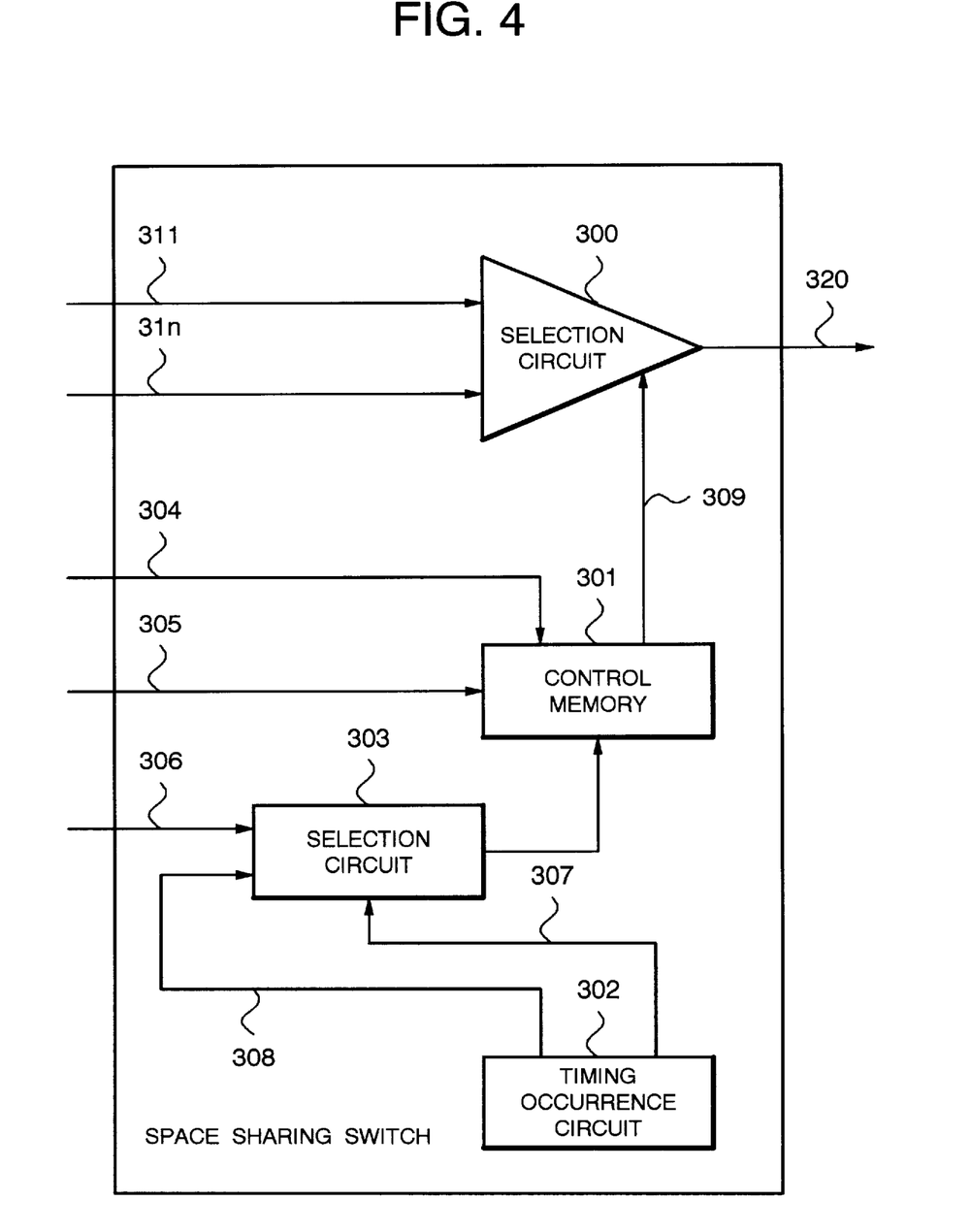
FIG. 4 is a block diagram showing the structure of a space sharing switch.

FIG. 4 is a block diagram showing the structure of a space sharing switch for use in the second switches 21, 22 to 2n. The space sharing switches shown in FIG. 4 comprises a selection circuit 300, a control memory 301, a timing occurrence circuit 302, and a selection circuit 303.

The selection circuit 300 is a selection circuit for performing space sharing switching, to supply signals 311 to 31n received from the n-number of input highways to an output highway 320. The selection circuit 300 receives the output data of the control memory 301 as a selection signal.

The control memory 301 receives the input highway number information 304 supplied from the processor controlling the space sharing switch. The address input of the control memory 301 is connected to the selection circuit 303.

The selection circuit 303 switches the connection time slot number information 306 supplied from the processor controlling the space sharing switch and the time slot number information 308 supplied from the timing occurrence circuit 302 according to a switching signal 307 supplied from the timing occurrence circuit 302, and supplies either one to the address input of the control memory 301.

The timing occurrence circuit 302 is a kind of counter, similarly to the timing occurrence circuit 202 shown in FIG.

2, repeating the generation of the time slot number information 209 incrementing sequentially from "0" to "2047".

Figure 5:
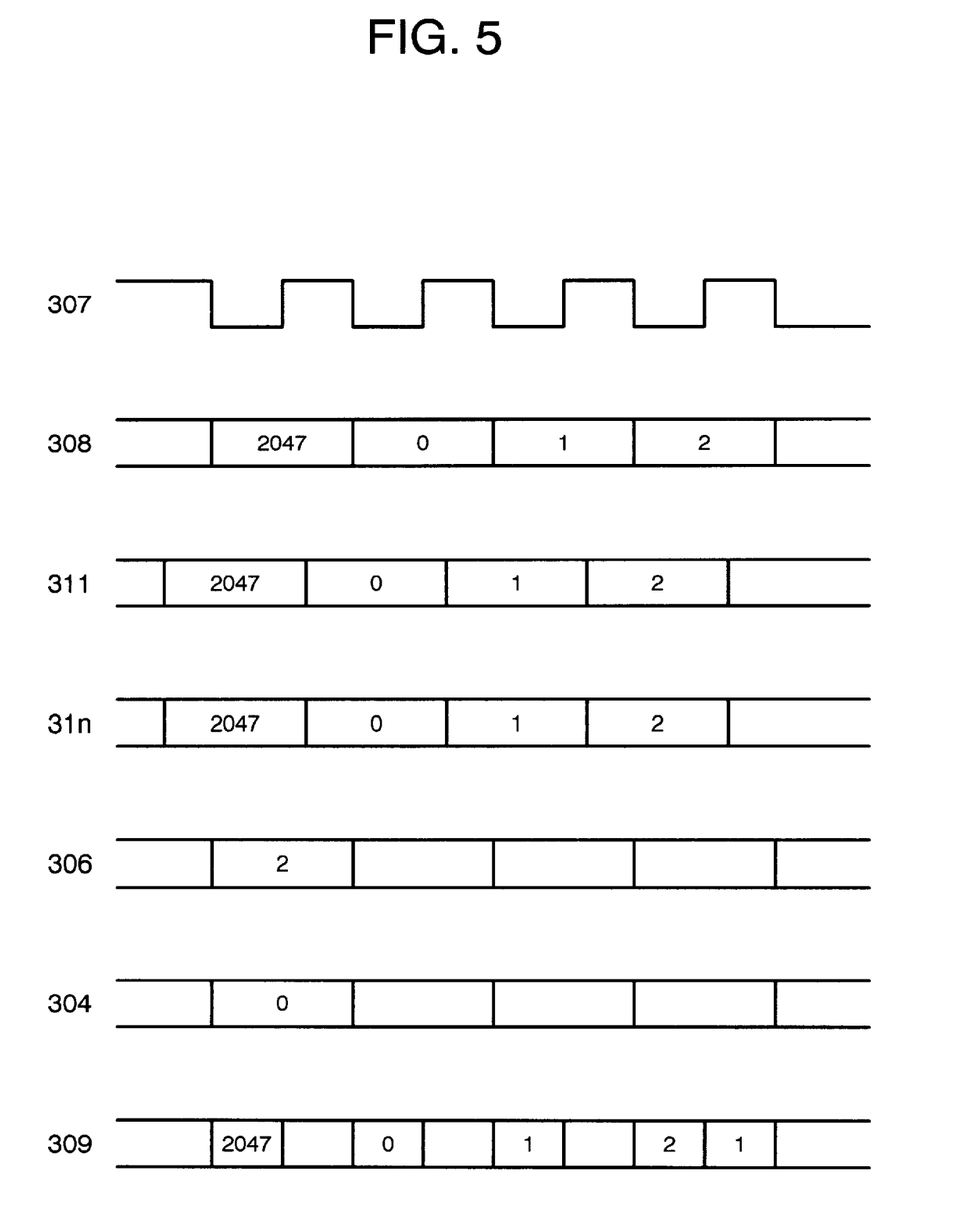
FIG. 5 is a timing chart showing the operation of the space sharing switch.

With reference to the timing chart of FIG. 5, the operation of the space sharing switch will be described this time. At the timing "0" in the switching signal 307, the selection circuit 303 supplies the connection time slot number information 306 to the control memory 301 as the address signal thereof, so as to write the connection inside highway number information 304 therein. At the timing "1" in the switching signal 307, the selection circuit 303 supplies the time slot number information 308 to the control memory 301 as the address signal thereof. As a result, the inside highway information stored in the control memory 301 on the address corresponding to the time slot number is read out therefrom and supplied to the selection circuit 300.

In the above operation, the PCM signal of an input highway selected from the input highways 311 to 31n at the timing corresponding to the relevant time slot can be supplied to the output highway 320. The above operation is a highway switching operation.

The interposing bus 60 is a bus for use in information transmission among the processors 41, 42 to 4n, which can be connected by various conventional means. Though it is generally connected by a LAN such as the EtherNet, Token Ring, or the like, any means capable of data communication among a plurality of processors will do.

Figure 6:
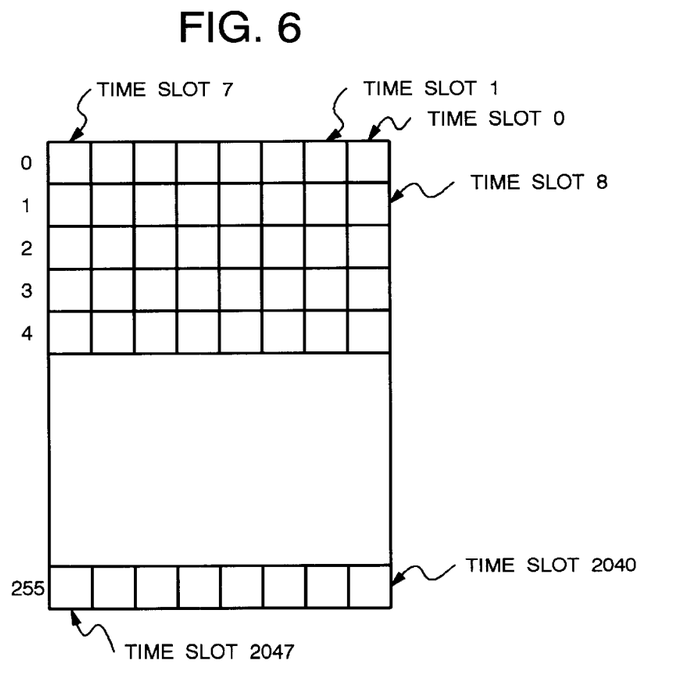
FIG. 6 is a view for use in describing information on spare time slot.

The memories 91, 92 to 9n corresponding to the respective processors 41, 42 to 4n store the space time slot information of the corresponding first switches 11, 12 to 1n and third switches 31, 32 to 3n. FIG. 6 shows an example of the time slot information. In the example, if empty, "0" is registered in each bit for one bite, and if occupied (already connected to the other switch), "1" is registered there. In this case, since the time sharing switch is of 2048 channels, the data of 256 bites are stored. In this example, though "empty" is defined as "0" and "occupied" is defined as "1", it is possible to reverse the numbers.

The concrete operation of the embodiment will be described, by way of example, in the case of achieving a switching connection from the terminal 102 under the control of the processor 42 to the terminal 101 under the control of the processor 41. In this connection, it is necessary to connect a path passing from the terminal 102 to the terminal 101, via the first switch 12, the second switch 21, and the third switch 31. In order to enable the second switch to exchange highways, it is necessary to coincide the time slots on the output side of the first switch with the time slots on the input side of the third switch.

Figure 7:
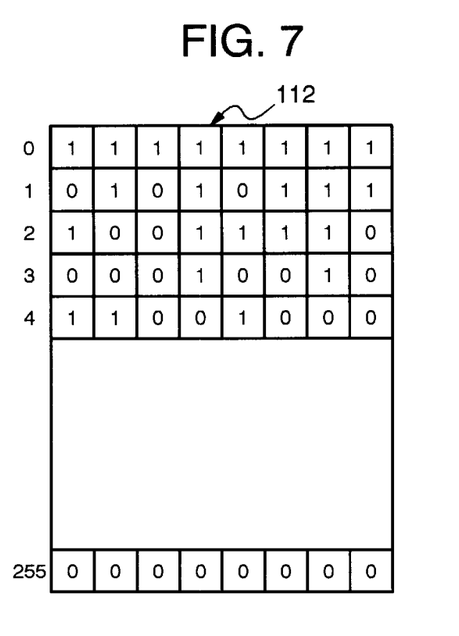
FIG. 7 is a view for use in describing a concrete example of the spare time slot information.
Figure 8:
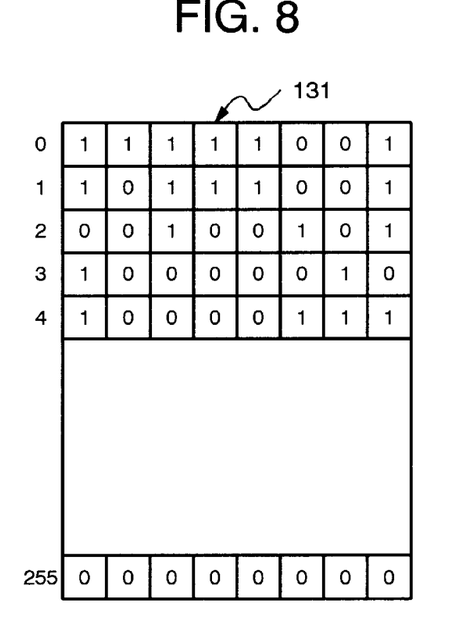
FIG. 8 is a view for use in describing another concrete example of the spare time slot information.

The processor 42 on the input side of this connection notifies the processor 41 about the spare time slot information 112 (refer to FIG. 7) of the first switch 12 of its own control through the interposing bus 60. The processor 41 makes a comparison between the received spare time slot information 112 and the spare time slot information 131 (refer to FIG. 8) of the third switch of its own control.

Figure 9:
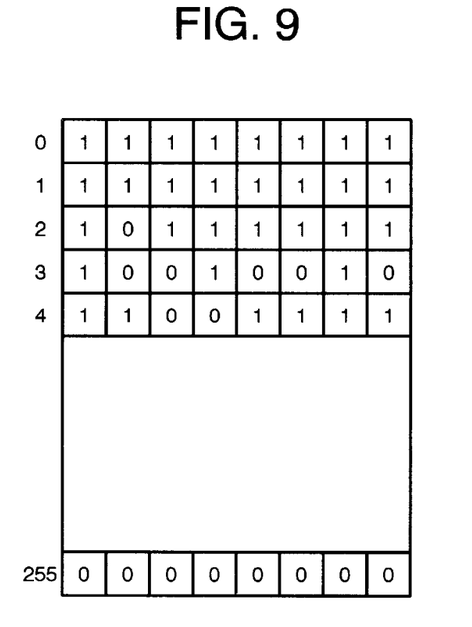
FIG. 9 is a view for use in describing a comparison result of the spare time slot information of FIG. 7 and that of FIG. 8.

In order to find the time slots being both empty in comparison of the time slot information 112 and the time slot information 131, the logical OR of the two in every bit is calculated and each time slot "m" in which the both values are "0" is selected. The result of the logical OR of the time slot information 112 and the time slot information 131 is shown in FIG. 9. The logical OR in every bit can be performed also by the logical OR instruction of a processor, or it can be obtained by providing there with another hardware for obtaining the logical OR. In the embodiment, the numeral "0" is used to express the empty state of a time slot. However, when the numeral "1" is used to express the empty state of a time slot, it is needless to say that the time slot information 112 and the time slot information 131 are not ORed but ANDed.

The processor 41 notifies the processor 42 to the effect that each time slot "m" of the empty state is selected by comparison of the time slot information 112 and the time slot information 131 through the interposing bus 60. In the third switch 31, the time slots for accommodating the terminal 102 are connected to the time slots "m" and each corresponding bit of the time slot information 131 in the memory 91 is set at "1".

Upon receipt of the notice from the processor 41, the processor 42 connects the time slots for accommodating the terminal 101 to the time slots "m" in the first switch 12, and sets each corresponding bit of the time slot information 112 in the memory 92 at "1".

Thereafter, the processor 41 controls the second switch 21 through the I/O bus 51 and connects the output highway 72 of the first switch 12 with the output highway 81 of the second switch 21, thereby completing the connection from the terminal 101 to the terminal 102.

As set forth hereinabove, according to the highway switch control system and control method of the present invention, since a processor provided together with a first switch and a third switch in a T-S-T three-stage time sharing switch system so as to control the individual switches, has a further function of controlling a second switch, it is possible to control the T-S-T three-stage time sharing switch without providing with any processor for common control of second switches. Therefore, even if a fault occurs in a processor for controlling the second switches, it can avoid the risk that the whole system fails to do switching, thereby realizing an extremely reliable highway switch control suitable for a decentralized control.

Further, the present invention can achieve the above effects by abolishing the structure of common control and thereby with a simple circuitry, it is suitable for a large scaled switching system like T-S-T structure.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A highway switch control system for controlling a time division multiplex highway switch of T-S-T three-stage switches in a multiprocessor typed electronic switching system comprising:

a plurality of sets of first switches operating in a time sharing switching method, second switches operating in a highway switching method, third switches operating in a time sharing switching method, and control processors for controlling each respective first, second, and third switches, each said set comprising one of said first switches, one of said second switches, one of said third switches, and a corresponding one of said control processors;

interconnecting means for interconnecting said control processors in each set to each other;

first output highways for connecting each of said first switches in every set to all said second switches of all sets; and second output highways for respectively connecting said second switches to said third switches in every set, two of said control processors getting information about spare time slots of each other's corresponding switches through said interconnecting means and deciding time slots for use in a connection, thereby controlling the connection between their corresponding switches.

2. A highway control system as set forth in claim 1, further comprising connection means for exclusive use in connecting said control processors to said second switches in each set.

3. A highway control system as set forth in claim 1, wherein each of said sets further comprises a storing means for storing information about spare time slots of said corresponding switches, and said control processors decide time slots for use in the connection with reference to the information stored in said storing means.

4. A highway control system as set forth in claim 1, wherein each of said sets further comprises a storing means for storing information about spare time slots of said corresponding switches, and said control processor compares the information stored in said storing means of the same set and the information stored in said storing means of another set to detect coincident spare time slots for use in the connection.

5. A highway switch control method for controlling a time division multiplex highway switch by employing a separate control processor provided for each of a plurality of sets comprising a first switch operating in a time sharing switching method, a second switch operating in a highway switching method, and a third switch operating in a time sharing switching method forming T-S-T three-stage switches, in a multiprocessor type electronic switching system, the method comprising the steps of:

deciding time slots for use in a connection by employing two of said control processors to examine spare time slots of a first switch and a third switch for controlling the connection of the first switch to the third switch, and connecting an output highway between the first switch and a second switch corresponding to the third switch and an output highway between said second switch and a corresponding third switch, at a timing of the decided time slots for use in the connection.

6. A highway switch control method as set forth in claim 5, wherein said time slot deciding step further includes:
delivering an information about the spare time slots of said first switch to said control processor controlling said third switch, deciding, upon receipt of the information about the spare time slots of said first switch, that coincident spare time slots will be used in the connection by making a comparison between the received information and the information about the spare time slots of said third switch, and notifying said control processor controlling said first switch of the decided time slots for use in the connection.

7. A computer readable memory storing a computer program for controlling a time division multiplex highway switch by activating a separate control processor provided for each of a plurality of sets, each set comprising a first switch operating in a time sharing switching method, a second switch operating in a highway switching method, and a third switch operating in a time sharing switching method forming T-S-T three-stage switches, in a multiprocessor typed electronic switching system, the computer program comprising deciding time slots for use in a connection by employing two of said control processors to examine spare time slots of a first switch and a third switch for controlling the connection of the first switch to the third switch, and connecting an output highway between the first switch and a second switch corresponding to the third switch and an output highway between the second switch and the corresponding third switch at a timing of the decided time slots for use in the connection.

8. A computer readable memory as set forth in claim 7, wherein said time slot deciding step of the computer program further includes:

delivering an information about the spare time slots of said first switch to said control processor controlling said third switch, deciding, upon receipt of the information about the spare time slots of said first switch, that coincident spare time slots will be used in the connection by making a comparison between the received information and the information on the spare time slots of said third switch, and notifying said control processor controlling said first switch of the decided time slots for use in the connection.

9. A highway switch control system for controlling time division multiplex highway switches in a multiprocessor typed electronic switching system comprising:

a plurality of sets of first switches operating in a time sharing switching method, second switches operating in a highway switching method, third switches operating in a time sharing switching method, and control processors for controlling each respective first, second, and third switches, each said set comprising one of said first switches, one of said second switches, one of said third switches, and a corresponding one of said control processors;

interconnecting means for interconnecting said control processors in each set to each other;

first output highways for connecting each of said first switches in every set to all said second switches of all sets; and second output highways for respectively connecting said second switches to said third switches in every set, two of said control processors getting information about spare time slots of each other's corresponding switches through said interconnecting means and deciding time slots for use in a connection, thereby controlling the connection between their corresponding switches.

10. A highway switch control method for controlling a time division multiplex highway switch by employing a separate control processor provided for each of a plurality of sets comprising a first switch operating in a time sharing switching method, a second switch operating in a highway switching method, and a third switch operating in a time sharing switching method forming three-stages switches, in a multiprocessor type electronic switching system, the method comprising the steps of:

deciding time slots for use in a connection by employing two of said control processors to examine spare time slots of a first switch and a third switch for controlling the connection of the first switch to the third switch, and connecting an output highway between the first switch and a second switch corresponding to the third switch and an output highway between said second switch and a corresponding third switch, at a timing of the decided time slots for use in the connection.

11. A computer readable memory storing a computer program for controlling a time division multiplex highway switch by activating a separate control processor provided for each of a plurality of sets, each set comprising a first switch operating in a time sharing switching method, a second switch operating in a highway switching method, and a third switch operating in a time sharing switching method forming three-stage switches, in a multiprocessor typed electronic switching system, the computer program comprising deciding time slots for use in a connection by employing two of said control processors to examine spare time slots of a first switch and a third switch for controlling the connection of the first switch to the third switch, and connecting an output highway between the first switch and a second switch corresponding to the third switch and an output highway between said second switch and the corresponding third switch at a timing of the decided time slots for use in the connection.

* * * * *